United States Patent
Joung

(10) Patent No.: US 8,079,272 B2
(45) Date of Patent: Dec. 20, 2011

(54) TACTILE SENSOR

(75) Inventor: Il Kweon Joung, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 231 days.

(21) Appl. No.: 12/382,674

(22) Filed: Mar. 20, 2009

(65) Prior Publication Data

US 2010/0077868 A1    Apr. 1, 2010

(30) Foreign Application Priority Data

Sep. 30, 2008   (KR) .................. 10-2008-0096309

(51) Int. Cl.
    *G01D 7/00*    (2006.01)
(52) U.S. Cl. ................................... 73/862.046
(58) Field of Classification Search .......... 73/862.041–862.046
    See application file for complete search history.

(56) References Cited

U.S. PATENT DOCUMENTS

| | | | | |
|---|---|---|---|---|
| 4,562,742 A * | 1/1986 | Bell | ................................ | 73/718 |
| 6,508,137 B2 * | 1/2003 | Suzuki | ..................... | 73/862.043 |
| 6,787,865 B2 * | 9/2004 | Endo et al. | ..................... | 257/414 |
| 6,823,747 B2 * | 11/2004 | Hasegawa et al. | .......... | 73/862.52 |
| 6,958,614 B2 * | 10/2005 | Morimoto | ..................... | 324/661 |
| 7,154,481 B2 * | 12/2006 | Cross et al. | ..................... | 345/173 |
| 7,194,905 B2 * | 3/2007 | Yamamoto et al. | ......... | 73/514.32 |
| 7,398,587 B2 * | 7/2008 | Morimoto | ..................... | 29/592.1 |
| 7,409,876 B2 * | 8/2008 | Ganapathi et al. | ........ | 73/862.046 |
| 7,499,025 B2 * | 3/2009 | Endo et al. | ..................... | 345/157 |

FOREIGN PATENT DOCUMENTS

| | | |
|---|---|---|
| KR | 10-2002-0071106 | 9/2002 |
| KR | 10-2007-0096655 | 10/2007 |
| KR | 10-2007-0106225 | 11/2007 |

OTHER PUBLICATIONS

Korean Office Action received May 6, 2010 in corresponding Japanese Patent Application No. 10-2008-0096309.

* cited by examiner

*Primary Examiner* — Lisa Caputo
*Assistant Examiner* — Octavia Davis

(57) ABSTRACT

A tactile sensor includes a substrate, electrodes arranged on the substrate, a conductive resistor membrane spaced apart from the electrodes by a predetermined distance, and an elastic member spaced apart from the resistor membrane by a predetermined distance.

11 Claims, 4 Drawing Sheets

TACTILE SENSOR

CROSS-REFERENCE TO RELATED APPLICATIONS

This application claims under 35 U.S.C. §119(a) the benefit of Korean Patent Application No. 2008-96309 filed on Sep. 30, 2008, in the Korean Intellectual Property Office, the disclosure of which is incorporated herein by reference in its entirety.

BACKGROUND OF THE INVENTION

1. Field of the Invention

The present invention relates to a tactile sensor, and more particularly, to a pressure sensitive tactile sensor having a simple structure and designed with different sensitivities depending on uses.

2. Description of the Related Art

The human hand is an important part that takes charge of the sense of touch among the several senses. The term "the sense of touch" refers to information about, for instance, touch force, surface roughness, surface temperature, and so on. If there is an element capable of sensing a touch like the human hand, this element can be applied to a variety of fields. Tactile technologies can be applied to typical robots and medical instruments as well as input devices for displays, and thus are promising technologies that can be applied to various fields.

These tactile technologies detect a contact force with an object in order to obtain the sense of touch similar to that of the human being. In this manner, if a sensor serving as each of the pressure points distributed throughout the human skin is realized, this tactile sensor can be applied to various fields.

A conventional touch-type static capacitive sensor is a sensor that detects a position by calculating magnitude of static capacitance varied when a pen or a finger is touched to a insulation layer formed on electrodes.

As the tactile sensor is applied to various fields, efforts are being made to produce the tactile sensor having a simple structure, a small size, and high performance.

SUMMARY OF THE INVENTION

Aspects of the present invention provide a tactile sensor capable of being miniaturized, providing high sensitivity, and being designed with different sensitivities depending on uses.

According to an aspect of the present invention, the tactile sensor may include a substrate; electrodes arranged on the substrate; a conductive resistor membrane spaced apart from the electrodes by a predetermined distance, with the electrodes interposed between the substrate and the conductive resistor membrane; and an elastic member spaced apart from the resistor membrane by a predetermined distance, with the conductive resistor membrane interposed between the elastic member and the electrodes.

The tactile sensor may further include a first spacer disposed between the electrodes and the resistor membrane so as to separate the electrodes from the resistor membrane, and a second spacer disposed between the resistor membrane and the elastic member so as to separate the resistor membrane from the elastic member.

The resistor membrane may be elastically deformed toward the electrodes by pressure.

The elastic member may be varied comes into contact with the resistor membrane on a contact area, which is varied depending to intensity of pressure applied to one surface thereof.

The elastic member may have a convex surface facing the resistor membrane.

The convex surface may have a curvature such that the contact area is increased in proportion to the intensity of the pressure applied to the elastic member.

Some of the electrodes are connected to a power supply terminal and the others of the electrodes are connected to a ground terminal.

The electrodes may be arranged so that the neighboring electrodes have different polarities.

The electrodes may be arranged in an n×n array.

The electrodes may be arranged so that intervals therebetween are gradually increased from a central electrode to outer circumferential electrodes.

The tactile sensor may further include an analog-digital converter connected between one of a power supply terminal and a ground terminal and resistors formed by contact of the resistor membrane with the electrodes so as to measure pressure applied to the elastic member.

According to exemplary embodiments of the present invention, the tactile sensor can be made small, provide high sensitivity, and be designed with different sensitivities depending on uses.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EXEMPLARY EMBODIMENTS

Exemplary embodiments of the present invention will now be described in detail with reference to the accompanying drawings.

Figure 1:
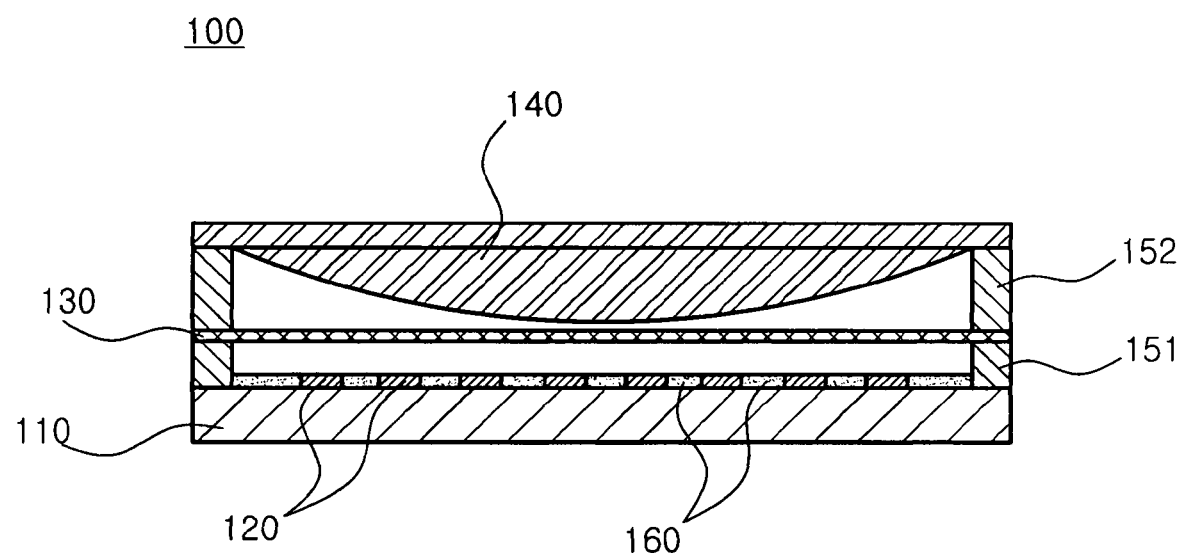
FIG. 1 is a cross-sectional view illustrating a tactile sensor according to an embodiment of the present invention.

FIG. 1 is a cross-sectional view illustrating a tactile sensor according to an embodiment of the present invention.

Referring to FIG. 1, the tactile sensor 100 includes a substrate 110, at least one electrode 120, a resistor membrane 130, and an elastic member 140.

The substrate 110 includes a printed circuit board (PCB) or a flexible printed circuit board (FPCB). The substrate 110 includes circuit wiring for connecting the electrode 120 with another electrode.

The substrate 110 includes a great number of electrodes 120.

In this embodiment, some of the electrodes 120 are connected to a power supply terminal, and the remaining ones are connected to a ground terminal. Among the electrodes 120, ones having different polarities are conducted by the resistor membrane 130, so that resistors can be connected in parallel between the power supply terminal and the ground terminal. In this embodiment, the tactile sensor can sense pressure applied to the elastic member on the basis of a value of resistance of the resistors connected in parallel.

The electrodes 120 formed on the substrate 110 can be arranged in a predetermined pattern. In this embodiment, the electrodes are arranged in an n×n array, and the wiring is formed such that, among the arranged electrodes, the neighboring ones have different polarities. The wiring connects the electrodes, which are formed so as to be exposed to the top surface of the substrate 110, to the power supply terminal or the ground terminal, and is formed in the interior of the substrate 110.

A insulation layer 160 is formed on the top surface of the substrate 110, excluding the exposed electrodes 120. The insulation layer 160 has the same thickness as the electrodes 120. In this manner, the insulation layer 160 is formed on the top surface of the substrate 110, so that the electrodes 120 exposed to the top surface of the substrate 110 can be firmly fixed to the substrate.

The resistor membrane 130 is spaced apart from the electrodes 120 by a predetermined distance.

The resistor membrane 130 contains a conductive material. The resistor membrane 130 is elastically deformed toward the electrodes 120 when pressed. When the resistor membrane 130 is pressed to come into contact with some of the electrodes 120, the electrodes 120 contacted with the resistor membrane 130 can be conducted one another. In this embodiment, since the wiring is formed such that the neighboring electrodes 120 have different polarities, the neighboring electrodes 120 contacted with the resistor membrane 130 differ from each other in polarity. The electrodes 120 have different polarities are electrically connected by the contact with the resistor membrane 130, and thus resistance can be generated between the electrically connected electrodes by the resistor membrane 130.

In this embodiment, the resistance generated by the resistor membrane 130 is equivalent to that formed between the power supply terminal and the ground terminal. In the case in which a number of electrodes are contacted with the resistor membrane 130, a number of resistors are connected in parallel between the power supply terminal and the ground terminal. As the number of resistors connected in parallel increases, the resistance value of the resistors connected in parallel becomes small. Thus, as the number of electrodes contacted with the resistor membrane 130 increases, voltage applied to the resistors connected in parallel becomes low.

A first spacer 151 is disposed between the substrate 110 and the resistor membrane 130 so as to keep the electrodes 120 spaced apart from the resistor membrane 130 by a predetermined distance. The first spacer 151 is higher than the electrodes 120 formed on the substrate. The height of the first spacer 151 is appropriately determined in consideration of an elastic modulus of the resistor membrane 130, and so on.

The elastic member 140 is disposed so as to be spaced apart from the resistor membrane 130 by a predetermined distance. The elastic member 140 faces the resistor membrane 130 on one surface thereof and the outside on the other surface thereof. When the other surface of the elastic member 140 is pressed, the elastic member 140 comes into contact with the resistor membrane 130.

In this embodiment, the elastic member 140 is configured so that the other surface thereof facing the resistor membrane 130 has a convex surface. In this manner, since the other surface of the elastic member 140 has the convex surface, a contact area of the elastic member 140 with the resistor membrane 130 is increased in proportion to magnitude of the pressure applied to the elastic member 140. The contact area of the elastic member 140 with the resistor membrane 130 caused by the pressure can be varied depending on a curvature of the convex surface of the elastic member 140.

The elastic member 140 contains a silicon component. The sensitivity of the tactile sensor is dependent on the elastic modulus of the elastic member 140. The elastic modulus of the elastic member 140 can be properly adjusted by controlling components of the materials contained in the elastic member.

A second spacer 152 is disposed between the resistor membrane 130 and the elastic member 140 so as to keep the resistor membrane 130 spaced apart from the elastic member 140 by a predetermined distance. The second spacer 152 is higher than the elastic member 140 having the convex surface. The height of the second spacer 152 is appropriately determined in consideration of an elastic modulus of the elastic member 140, and so on.

Figure 2A:
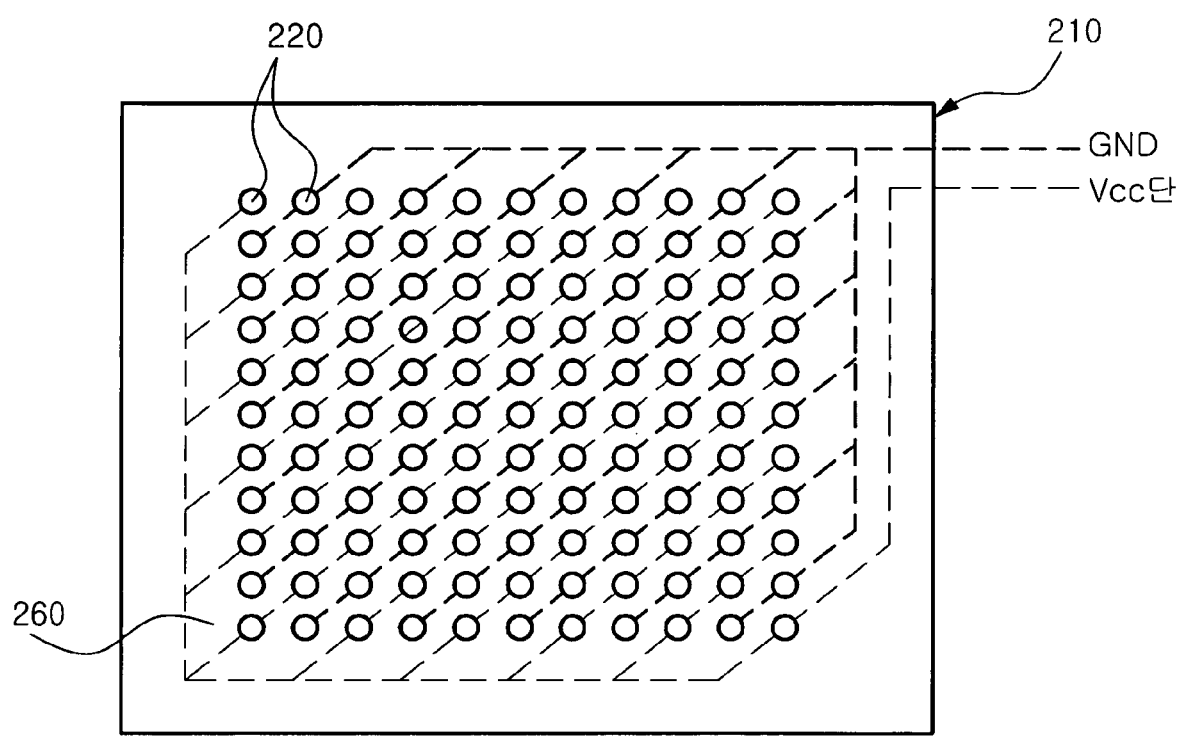
FIGS. 2A and 2B illustrate arrangements of electrodes formed on a substrate, which is used for a tactile sensor according to an embodiment of the present invention.
Figure 2B:
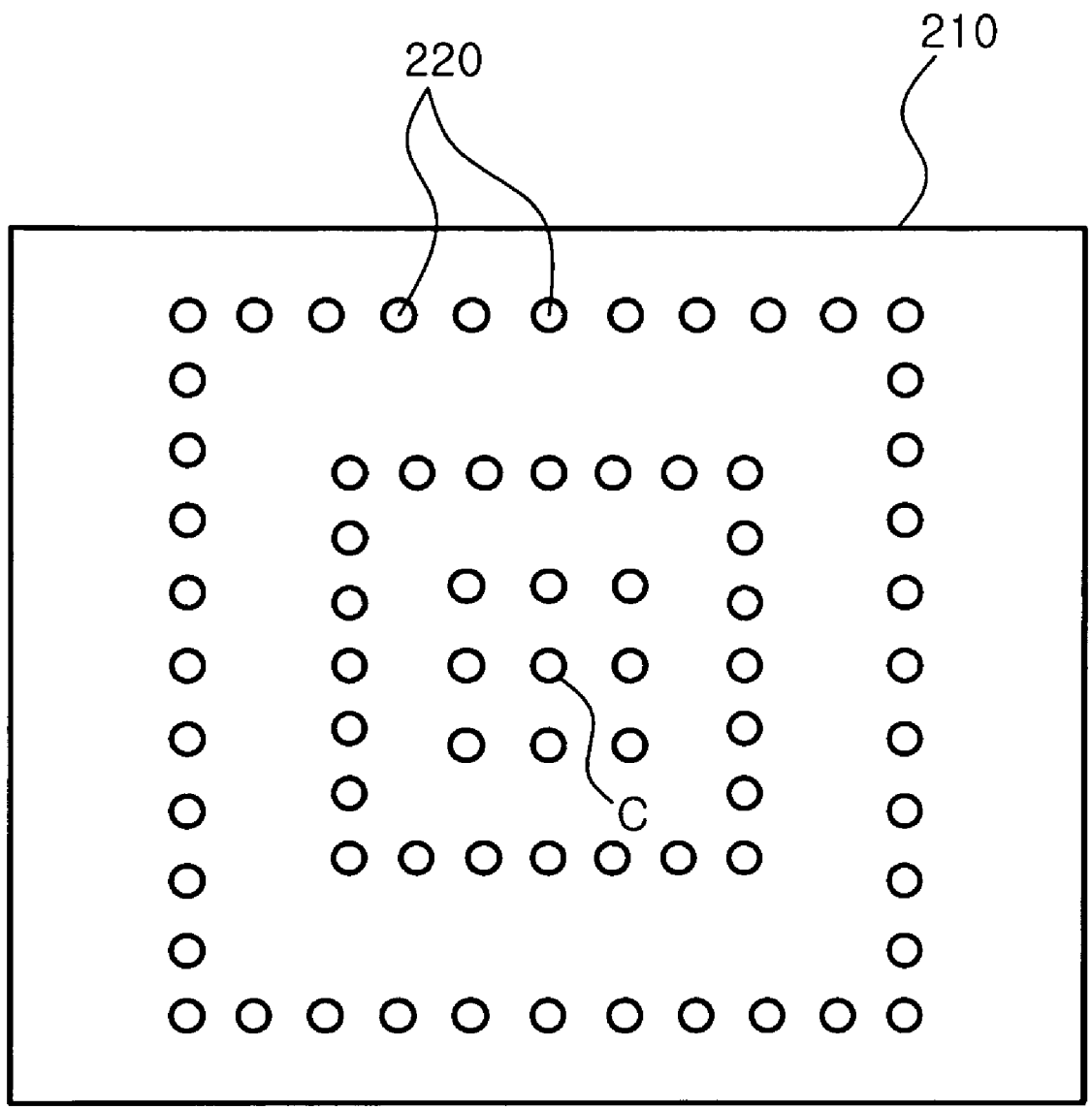

FIGS. 2A and 2B illustrate arrangements of electrodes formed on a substrate, which is used for a tactile sensor according to an embodiment of the present invention.

Referring to FIG. 2A, in this embodiment, the tactile sensor is configured so that a number of electrodes 220 are arranged on a substrate 210. The electrodes 220 are arranged in an n×n array. Intervals between the arranged electrodes 220 are identical to each other. For example, an 11×11 array of electrodes maybe arranged. Among the arranged electrodes 220, the neighboring ones are connected so as to have different polarities. The electrodes 220 are exposed to a top surface of the substrate 210, and wiring connecting the electrodes is formed in the interior of the substrate 210.

The tactile sensor has sensitivity depending on the number of electrodes formed on the substrate having the same area. In detail, the narrower the interval between the arranged electrodes becomes, the more the number of electrodes conducted in response to a weak pressure becomes. Thus, the tactile sensor has high sensitivity. In contrast, if the interval between the arranged electrodes is wide, the tactile sensor cannot sense a pressure difference as long as the pressure is not applied to a predetermined level or more.

A insulation layer 260 is formed on the top surface of the substrate 210, excluding the exposed electrodes 220. The insulation layer 260 has the same thickness as the electrodes 220. In this manner, the insulation layer 260 is formed on the top surface of the substrate 210, so that the electrodes 220 exposed to the top surface of the substrate 210 can be stably fixed to the substrate 210.

The electrodes 220 can be variously arranged. The arrangement of the electrodes 220 can be varied such that a resistance value of resistors connected in parallel due to the conducted electrodes is linearly varied depending on intensity of the applied pressure. In FIG. 2B, the electrodes 220 are arranged in such a manner that the intervals therebetween are gradually increased from the central electrode C to outer circumferential electrodes. In this embodiment, on the assumption that the pressure is applied to a region corresponding to a position where the central electrode C is located, as the pressure applied to the region increases, the resistance value caused by the conducted electrodes can be linearly varied.

In this manner, the sensitivity of the tactile sensor can be varied depending on the intervals between the electrodes arranged on the substrate, and elastic modulus and shape of an elastic member which have an influence on the area where a resistor membrane comes into contact with the electrodes, and so on.

Figure 3A:
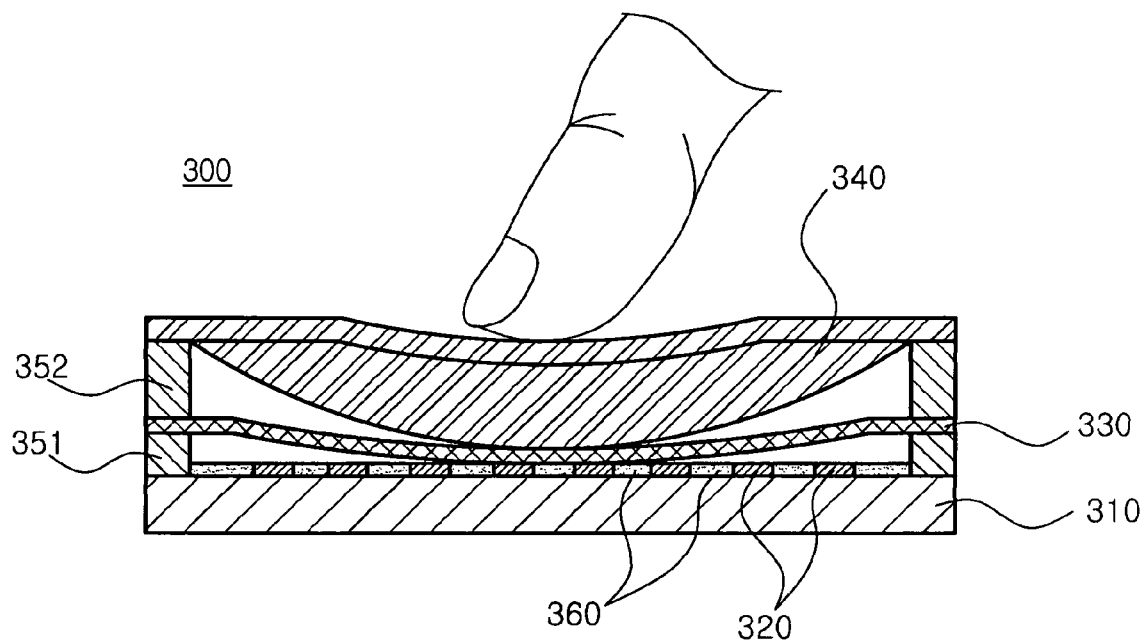
FIG. 3A is a cross-sectional view for explaining operation of a tactile sensor according to an embodiment of the present invention.
Figure 3B:
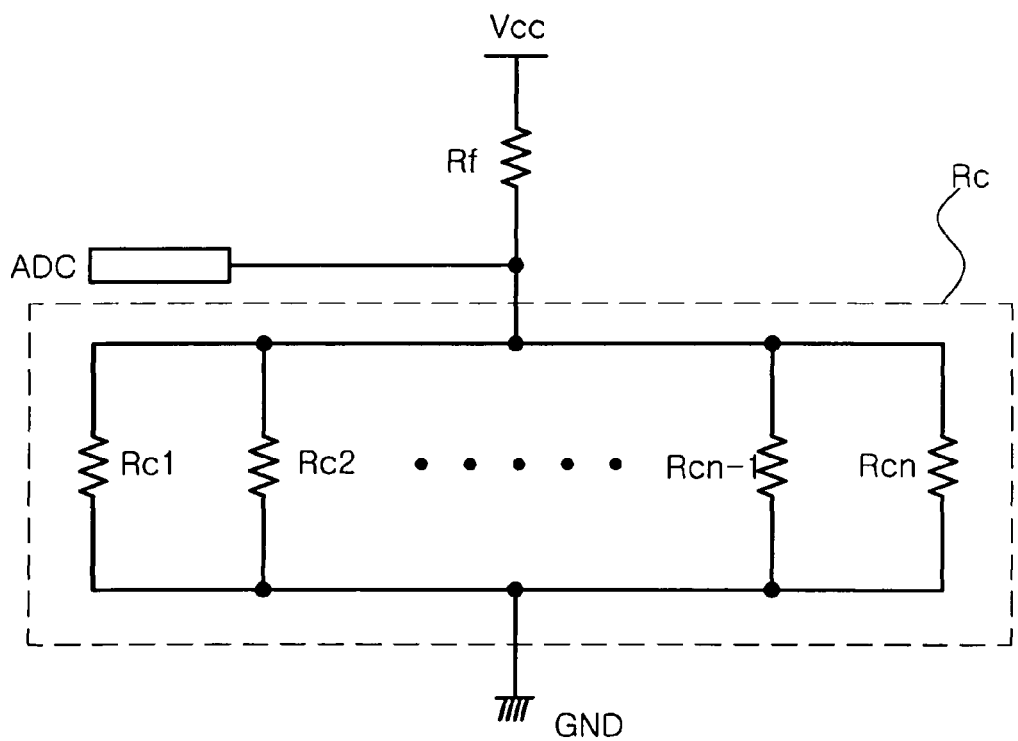
FIG. 3B is a circuit diagram for explaining operation of a tactile sensor according to an embodiment of the present invention.

FIG. 3A is a cross-sectional view for explaining operation of a tactile sensor according to an embodiment of the present invention, and FIG. 3B is a circuit diagram for explaining operation of a tactile sensor according to an embodiment of the present invention.

Referring to FIG. 3A, the tactile sensor 300 of this embodiment includes a substrate 310, a number of electrodes 320 formed on the substrate, a resistor membrane 330 spaced apart from the electrodes by a predetermined distance, and an elastic member 340 spaced apart from the resistor membrane by a predetermined distance.

First, an exposed surface of the elastic member 340 is pressed by a finger. The exposed surface of the elastic member 340 may be pressed by a pointed, rigid object instead of the finger. In this embodiment, since the elastic member 340 is used, although a shape of the pressing means is modified, the elastic member can maintain the identical contact area with respect to the resistor membrane 330 as long as magnitude of the pressure is identical.

One surface of the pressed elastic member 340 can apply the pressure to the resistor membrane 330 in contact with the resistor membrane 330. In this embodiment, the elastic member is configured so that one surface thereof contacted with the resistor membrane 330 has a convex surface. The convex surface of the elastic member 340 allows a contact area of the elastic member 140 with the resistor membrane 130 to be proportional to intensity of the pressure applied to the elastic member 340.

The resistor membrane 330 to which the pressure is applied by the elastic member 140 is deformed toward the electrodes 320, and thus comes into contact with some of the electrodes 320. The resistor membrane 330 contains a conductive material, and thus allows electric current to flow between the electrodes contacted with the resistor membrane 330. In this embodiment, among the electrodes 320, the neighboring ones are arranged so as to have different polarities, so that the resistor membrane 330 can function as a resistor between the neighboring electrodes 120 contacted with the resistor membrane 330.

When the pressure applied to the elastic member 340 is increased, the contact area of the elastic member 340 with the resistor membrane 330 becomes wide, so that the number of electrodes 320 contacted with the resistor membrane 330 is increased. In this manner, when the number of electrodes 320 contacted with the resistor membrane 330 is increased, the resistor membrane 330 serves as a resistor connected in parallel between the conducted electrodes. In this embodiment, the tactile sensor can sense the intensity of the pressure applied to the elastic member by detecting voltage applied to the resistor connected in parallel.

Referring to FIG. 3B, in this embodiment, the tactile sensor is configured so that among the electrodes formed on the substrate, some are connected to a power supply terminal 'Vcc,' and the others are connected to a ground terminal 'GND.'

In the tactile sensor illustrated in FIG. 3A, the resistors formed by the contact between the electrodes 320 and the resistor membrane 330 can be regarded as resistors 'Rc' connected in parallel between the power supply terminal 'Vcc' and the ground terminal 'GND.' In this embodiment, the tactile sensor is configured so that a reference resistor 'Rf' is connected in series between the power supply terminal 'Vcc' and the parallel resistors 'Rc,' and that an analog-digital converter 'ADC' is connected between the reference resistor 'Rf' and the parallel resistors 'Rc.'

The analog-digital converter 'ADC' measures voltage applied to the parallel resistors 'Rc' by dividing voltage applied to the power supply terminal 'Vcc' by a ratio of the reference resistor 'Rf' to the parallel resistors 'Rc,' so that it can detect the intensity of the pressure applied to the tactile sensor.

In FIG. 3B, the numerous resistors 'Rc1,' 'Rc2' . . . 'Rcn' are connected in parallel between the power supply terminal 'Vcc' and the ground terminal 'GND.' In FIG. 3A, when the resistor membrane 330 is deformed to contact some of the electrodes 320 on the substrate 310, the neighboring ones among the electrodes 320 contacted with the resistor membrane are conducted to one another. Thus, the resistance is generated between the power supply terminal 'Vcc' and the ground terminal 'GND' by the resistor membrane. When the number of electrodes 320 contacted with the resistor membrane 330 is increased, the number of resistors connected in parallel between the power supply terminal 'Vcc' and the ground terminal 'GND' is increased. The more the number of resistors connected in parallel becomes, the smaller the resistance value of the parallel resistors 'Rc' becomes. Accordingly, since the voltage applied to the tactile sensor is divided by the ratio of the reference resistor 'Rf' to the parallel resistors 'Rc,' the reduction of the resistance value of the parallel resistors 'Rc' causes the voltage measured by the analog-digital converter 'ADC' to be lowered. The intensity of the pressure applied to the tactile sensor can be detected by a change in the voltage measured by the analog-digital converter 'ADC.'

In this embodiment, the voltage, which is applied to the parallel resistors 'Rc' formed by the contact between the resistor membrane and the electrodes, is measured. However, the voltage applied to the reference resistor 'Rf' may be measured by connecting the reference resistor 'Rf' between the ground terminal 'GND' and the parallel resistors 'Rc.'

While the present invention has been shown and described in connection with the exemplary embodiments, it will be apparent to those skilled in the art that modifications and variations can be made without departing from the spirit and scope of the invention as defined by the appended claims.

What is claimed is:

1. A tactile sensor, comprising:
   a substrate;
   a plurality of electrodes arranged on the substrate;
   a conductive resistor membrane spaced apart from the electrodes, with the electrodes interposed between the substrate and the conductive resistor membrane;
   an elastic member spaced apart from the resistor membrane, with the conductive resistor membrane interposed between the elastic member and the electrodes;
   a first spacer disposed between the electrodes and the resistor membrane to separate the electrodes from the resistor membrane; and
   a second spacer disposed between the resistor membrane and the elastic member to separate the resistor membrane from the elastic member,
   wherein the second spacer is directly connected to the elastic member.

2. The tactile sensor of claim 1, wherein the resistor membrane is elastically deformed toward the electrodes by pressure.

3. The tactile sensor of claim 1, wherein the elastic member comes into contact with the resistor membrane on a contact area, which is varied according to a magnitude of a pressure applied to one surface thereof.

4. The tactile sensor of claim 1, wherein some of the electrodes are connected to a power supply terminal and other ones of the electrodes are connected to a ground terminal.

5. The tactile sensor of claim 4, wherein the electrodes are arranged so that neighboring ones of the electrodes have different polarities.

6. The tactile sensor of claim 1, wherein the electrodes are arranged in an n×n array.

7. The tactile sensor of claim 1, wherein the electrodes are arranged so that intervals therebetween are gradually increased from a central one of the electrodes to outer circumferential ones of the electrodes.

8. The tactile sensor of claim 1, wherein the first spacer is directly connected to the resistor membrane.

9. A tactile sensor, comprising:
a substrate;
a plurality of electrodes arranged on the substrate;
a conductive resistor membrane spaced apart from the electrodes, with the electrodes interposed between the substrate and the conductive resistor membrane;
an elastic member spaced apart from the resistor membrane, with the conductive resistor membrane interposed between the elastic member and the electrodes;
a first spacer disposed between the electrodes and the resistor membrane to separate the electrodes from the resistor membrane; and
a second spacer disposed between the resistor membrane and the elastic member to separate the resistor membrane from the elastic member,
wherein the elastic member comes into contact with the resistor membrane on a contact area, which is varied according to a magnitude of a pressure applied to one surface thereof, and
wherein the elastic member has a convex surface facing the resistor membrane.

10. The tactile sensor of claim 9, wherein the convex surface has a curvature such that the contact area is increased in proportion to the magnitude of the pressure applied to the elastic member.

11. A tactile sensor, comprising:
a substrate;
a plurality of electrodes arranged on the substrate;
a conductive resistor membrane spaced apart from the electrodes, with the electrodes interposed between the substrate and the conductive resistor membrane;
an elastic member spaced apart from the resistor membrane, with the conductive resistor membrane interposed between the elastic member and the electrodes;
a first spacer disposed between the electrodes and the resistor membrane to separate the electrodes from the resistor membrane;
a second spacer disposed between the resistor membrane and the elastic member to separate the resistor membrane from the elastic member; and
an analog-digital converter connected between one of a power supply terminal and a ground terminal and resistors formed by contact of the resistor membrane with the electrodes so as to measure pressure applied to the elastic member.

* * * * *